United States Patent
Miyata et al.

(10) Patent No.: US 7,155,461 B2
(45) Date of Patent: Dec. 26, 2006

(54) INFORMATION PROCESSING SYSTEM

(75) Inventors: Kenichi Miyata, Kawasaki (JP); Takashi Horiuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 199 days.

(21) Appl. No.: 10/420,972

(22) Filed: Apr. 21, 2003

(65) Prior Publication Data

US 2004/0117401 A1    Jun. 17, 2004

(30) Foreign Application Priority Data

Dec. 17, 2002    (JP) .............................. 2002-364550

(51) Int. Cl.
*G06F 12/00*    (2006.01)
*G06F 17/30*    (2006.01)

(52) U.S. Cl. ................. 707/200; 707/205; 707/10; 707/104.1

(58) Field of Classification Search ................ 707/102, 707/1, 200, 205, 10, 104.1; 713/200, 201, 713/188; 714/38; 482/4; 138/33

See application file for complete search history.

(56) References Cited

U.S. PATENT DOCUMENTS

| | | | | |
|---|---|---|---|---|
| 5,319,776 | A * | 6/1994 | Hile et al. .................. 713/200 |
| 5,440,723 | A * | 8/1995 | Arnold et al. ................. 714/2 |
| 5,473,769 | A * | 12/1995 | Cozza ......................... 714/39 |
| 5,475,625 | A * | 12/1995 | Glaschick ................... 709/224 |
| 5,485,575 | A * | 1/1996 | Chess et al. .................. 714/38 |
| 5,491,791 | A * | 2/1996 | Glowny et al. ............... 714/37 |
| 5,519,685 | A * | 5/1996 | Kato et al. ............. 369/112.19 |
| 5,544,308 | A * | 8/1996 | Giordano et al. ............. 714/26 |
| 5,684,875 | A * | 11/1997 | Ellenberger ..................... 482/4 |
| 5,696,701 | A * | 12/1997 | Burgess et al. ................ 714/25 |
| 5,696,822 | A * | 12/1997 | Nachenberg .................. 726/24 |
| 5,889,943 | A * | 3/1999 | Ji et al. ....................... 713/201 |
| 5,951,698 | A * | 9/1999 | Chen et al. .................... 714/38 |
| 5,960,170 | A * | 9/1999 | Chen et al. .................... 714/38 |
| 6,230,288 | B1 * | 5/2001 | Kuo et al. ..................... 714/38 |
| 6,269,456 | B1 * | 7/2001 | Hodges et al. ................ 714/38 |
| 6,305,423 | B1 * | 10/2001 | De Meyer et al. ............ 138/33 |
| 6,401,210 | B1 | 6/2002 | Templeton |
| 6,654,751 | B1 | 11/2003 | Schmugar |
| 6,721,721 | B1 * | 4/2004 | Bates et al. .................... 707/1 |
| 6,735,700 | B1 | 5/2004 | Flint et al. |
| 6,748,534 | B1 * | 6/2004 | Gryaznov et al. .......... 713/188 |
| 6,785,820 | B1 * | 8/2004 | Muttik et al. ............... 713/200 |

(Continued)

FOREIGN PATENT DOCUMENTS

WO    WO 00/28420 A    5/2000

OTHER PUBLICATIONS

Le Charlier et al., Dynamic Detection and Classification of Computer Viruses using General Behaviour Patterns, Jul. 1995, pp. 1-22.*

(Continued)

*Primary Examiner*—Frantz Coby
(74) *Attorney, Agent, or Firm*—Townsend and Townsend and Crew LLP

(57) ABSTRACT

Information such as a last scan time and a last update is encrypted and added to a file system that a CPU 132 on a host computer 13 manages. In accordance with the information, host 13 and a scan server work cooperatively. A scan is omitted for a file that is dated earlier than the last scan time, accelerating file access. When a file to be accessed is virus-infected, the user causing the virus infection is specified. Predetermined countermeasures can also be taken.

24 Claims, 7 Drawing Sheets

U.S. PATENT DOCUMENTS

| | | | |
|---|---|---|---|
| 6,851,057 B1* | 2/2005 | Nachenberg | 713/200 |
| 6,892,303 B1* | 5/2005 | Le Pennec et al. | 713/188 |
| 2002/0042886 A1* | 4/2002 | Lahti et al. | 713/201 |
| 2002/0103783 A1 | 8/2002 | Muhlestein | |
| 2002/0138760 A1 | 9/2002 | Naitoh | |
| 2002/0174350 A1 | 11/2002 | Franczek | |
| 2002/0174358 A1 | 11/2002 | Wolff et al. | |
| 2003/0033536 A1 | 2/2003 | Pak et al. | |
| 2003/0041259 A1 | 2/2003 | Vignoles et al. | |
| 2003/0065793 A1 | 4/2003 | Kouznetsov et al. | |
| 2003/0074574 A1 | 4/2003 | Hursey et al. | |
| 2003/0079145 A1* | 4/2003 | Kouznetsov et al. | 713/200 |
| 2003/0110280 A1 | 6/2003 | Hinchliffe et al. | |
| 2003/0110391 A1 | 6/2003 | Wolff et al. | |
| 2003/0120952 A1 | 6/2003 | Tarbotton et al. | |
| 2003/0177485 A1 | 9/2003 | Walden et al. | |
| 2004/0039933 A1 | 2/2004 | Martin et al. | |
| 2004/0193907 A1* | 9/2004 | Patanella | 713/200 |

OTHER PUBLICATIONS

Larry J. Hughes, Jr., "Actually Useful Internet Security Techniques,"*New Riders*, Part 1 Encryption and Authentication, Chapter 2 Data Confidentiality and Integrity, pp. 58-59.

Samuel J. Leffler, et al., *The Design and Implementation of the 4,3BSD UNIX Operating System*, Chapter 3 Kernel Services, Sections 3.7-.8 User and Group Identifiers, pp. 58-61, and Chapter 7 The Filesystem, Section 7.2, pp. 191-195.

John Phillips, "Antivirus Scanning Best Practices Guide," Network Appliance, TR 3107 (May 2, 2002), www.netapp.com/tech_library/3107.html, pp. 1-9.

* cited by examiner

INFORMATION PROCESSING SYSTEM

BACKGROUND OF THE INVENTION

The present invention relates to a technology for removing a virus infection in a file system.

In recent years, there has been a growing trend of large-scale storage device systems in association with an increase in the amount of information. When many users concurrently share a file server, access to files slows down and a problem arises with security of data to be accessed. For example, when a file in the file server is infected with a computer virus, many users are adversely affected.

To prevent damage due to virus infection, virus-detecting software (herein referred to as a virus scanner) is installed in a storage system to check, each time a file is accessed, whether or not a file is virus-infected. A large-scale file server is required to improve the virus scanner performance. A conventional technology for improving the virus scanner performance is used to determine whether or not to apply a process (hereafter referred to as a scan) for detecting a virus. Specifically, the technology searches a list of scanned files and omits a scan for a file that is found in the list. For example, such technology is disclosed in "Antivirus Scanning Best Practices Guide" by John Phillips at http://www.netapp.com/tech_library/3107.html.

BRIEF SUMMARY OF THE INVENTION

The above-mentioned method references a list of scanned files each time a scan request is issued. Consequently, increasing the number of files in the file list increases scanning costs and hinders acceleration of scanning. If a file is illegally added to a list of scanned files, it is possible to falsely assume that no scan is needed for a file that actually requires scanning. Depending on how to collect a record of accesses (hereafter referred to as a log), an unauthorized access may falsify the log itself. To locate a user who caused the file to be virus-infected and take proper countermeasures, there must be an inspection of a huge amount of records indicating accesses to files and users' log-ins to the server.

This invention eliminates unnecessary scans to accelerate file accesses. It also prevents unauthorized rewriting of information to provide a more secure information processing system.

A computer is provided with a virus database that manages various patterns of viruses. As file attribute information, the computer is also provided with a last scan time indicating the time when a file was last scanned. The virus database records the last update time when the same virus database was last updated. Unnecessary scans are removed by comparing a last scan time with a last update time. As file attribute information, a last updater is added to indicate the user who last scanned a file. The last scan time and the last updater are encrypted and stored to prevent unauthorized rewriting and improve the security of the information processing system.

DETAILED DESCRIPTION OF THE INVENTION

Figure 1:
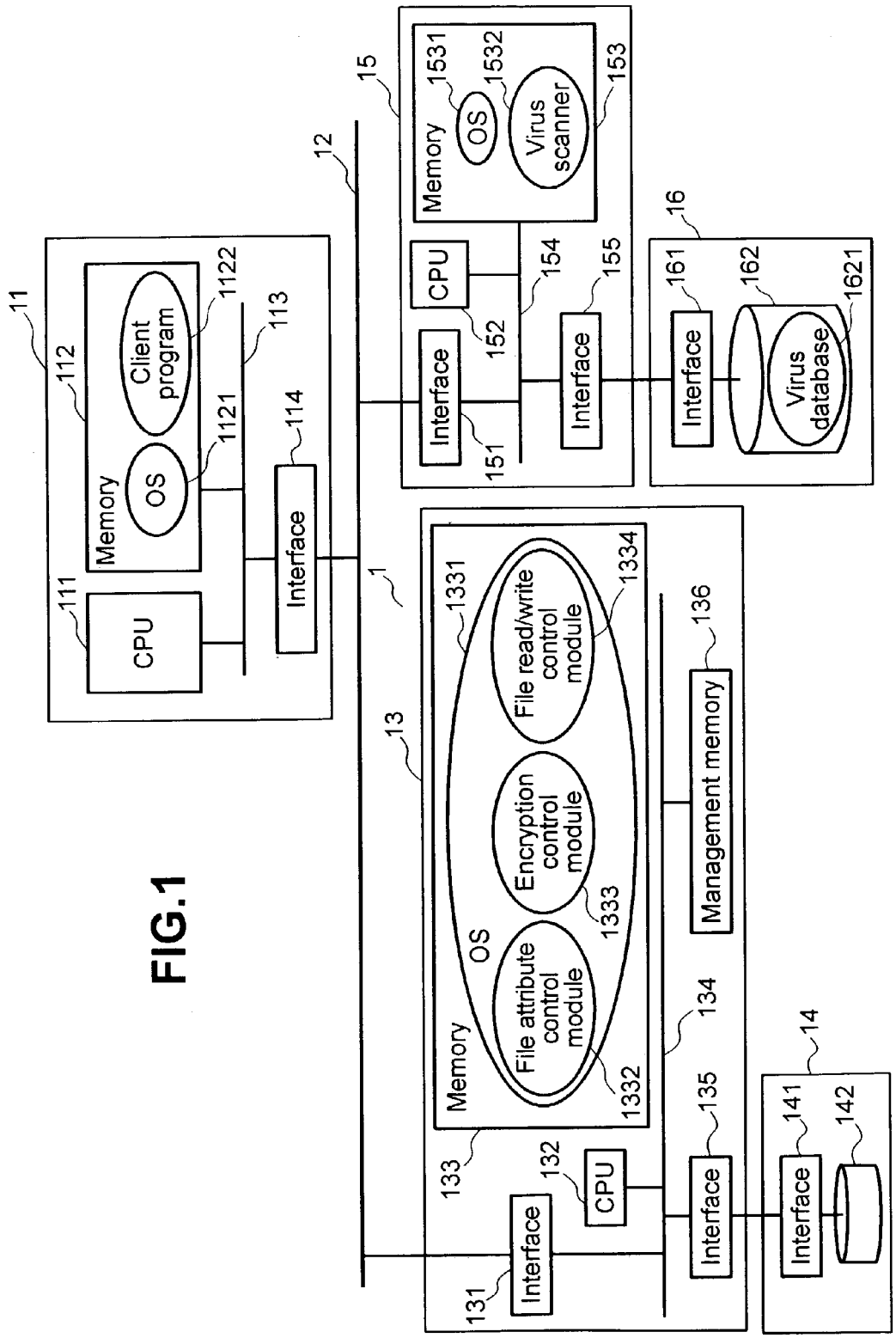
FIG. 1 exemplifies a system to which the present invention is applied.

Embodiments of the present invention are described below in further detail with reference to the accompanying drawings. The present invention is not limited thereto. FIG. 1 exemplifies an information processing system that includes a file server (herein often termed a file server system). In FIG. 1, an encircled element denotes software. A file sever system 1 is connected to a client computer (hereinafter referred to as a client) 11 and a scan server 15 via a network 12. Although FIG. 1 shows one client, for simplicity of discussion herein, a plurality of clients is usually available. File server system 1 includes a host computer (hereinafter referred to as a host) 13 and a storage device system 14.

Host 13 includes an interface 131 for connection with the network 12; a CPU 132; memory 133 containing an operating system 1331 (hereinafter abbreviated OS); a network 134 in the file server; an interface 135 for connection with the storage device system 14; and management memory 136 to store information about an apparatus. CPU 132 reads an OS 1331 from the memory 133 for processing. OS 1331 contains programs such as a file attribute control module 1332, an encryption control module 1333, and a file read/write control module 1334.

Figure 2:
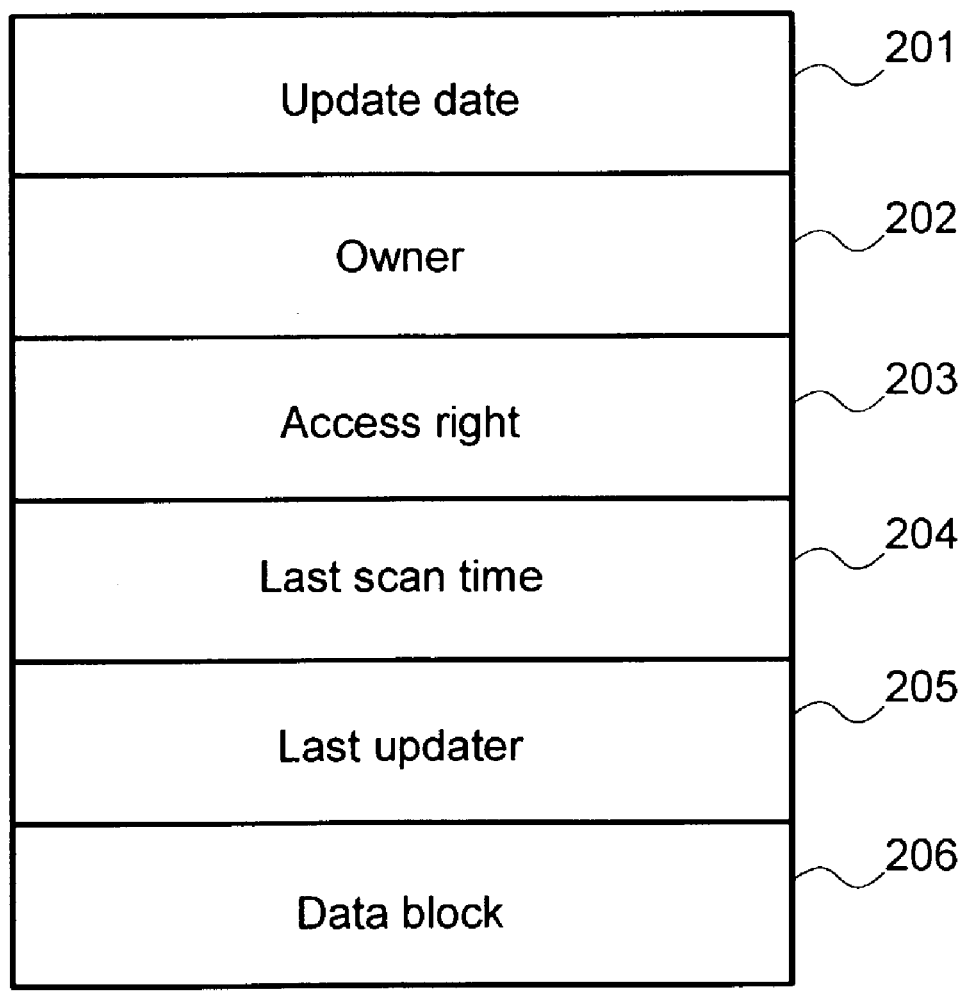
FIG. 2 shows a file configuration.

File attribute control module 1332 is a program that reads and writes a file attribute (FIG. 2). Encryption control module 1333 is a program that encrypts and decrypts a file attribute. File read/write control module 1334 is a program that reads and writes actual data of a file. Management memory 136 stores information about an apparatus' serial number and passes this serial number to CPU 132 according to a request from CPU 132 that executes OS 1331.

Storage device 14 includes an interface 141 for connection with the host and a storage device 142. Generally, storage device 142 uses magnetic media but may also use optical media and the like. Scan server 15 includes an interface 151 for connection with network 12; a CPU 152; memory 153 containing an OS 1531 and a virus scanner 1532; a network 154 in the scan server; and an interface 155 for connection with storage device system 16.

Storage device system 16 includes an interface 161 for connection with scan server 15 and a storage device 162 that contains a virus database 1621. Virus database 1621 manages various patterns of viruses and is updated on a scheduled or unscheduled basis. Virus database 1621 records the time a virus pattern was last updated.

CPU 152 executes virus scanner 1532, which compares a suspected file with associated patterns contained in virus database 1621. Client 11 includes a CPU 111; memory 112 containing an OS 1121 and a client program 1122; a network 113 in the client; and an interface 114 for connection with network 12. CPU 111 executes the OS 1121 to transmit instructions from client 11 to host 13. Although memory 133 and management memory 136 are provided separately in FIG. 1, the same memory may be used. Although scan server 15 is described as an independent computer differing from host 13, host 13 may include the function of scan server 15.

The following describes general processing of CPU 132 by executing OS 1331 to read and write files. First, CPU 132 prepares for accessing files. This operation is referred to hereinafter as "opening a file". CPU 132 then reads data from or writes data to the opened file. When the file becomes obsolete, CPU 132 performs post-processing. This operation is referred to hereinafter as "closing a file". To implement this sequence of operations, CPU 111 executes client program 1122 via network 12. When a file open request is issued to client 11, CPU 111 notifies file server system 1 of this request. Then, host 13 processes the request. The same sequence is performed for file operation requests.

Next is described general processing for opening files. When receiving a file open request from client 11, CPU 132 sends a scan request for the file and the file (hereinafter referred to as F) to scan server 15. Scan server 15 scans F. CPU 132 receives a scan result from scan server 15 and determines whether or not F is virus-infected based on the result. If F is not infected, CPU 132 opens F and notifies client 11 that F has been opened successfully. If F is infected, CPU 132 notifies client 11 that F cannot be opened. CPU 132 then proceeds to a process for reading and writing files.

FIG. 2 exemplifies a file attribute configuration according to the present invention. The file attribute includes an update date 201; an owner 202; an access right 203; a last scan time 204; a last updater 205; and a data block 206, and is stored in storage device 142. Update date 201 indicates the time the file content was last updated. Owner 202 indicates a number that uniquely identifies a user managed by CPU 132. Access right 203 indicates the right to read, write, or execute the file. Last scan time 204 indicates the time the file was last scanned. Last scan time 204 is updated when a scan is performed. Last updater 205 indicates the user who last updated the file. Last updater 205 is updated when data is written to the file. Data block 206 is an array of block numbers indicating data positions on the storage device 142.

When a new file is created, CPU 132 executes file attribute control module 1332 to initialize each value of the file attribute in FIG. 2. Commands for OS 1331 can be used to explicitly change the file attribute values. It is impossible to explicitly change last scan time 204 and last updater 205. The last updater can log lists not only the user who last updated the file content, but also a specified number of users. One method is to record as many updaters as a value found by dividing an average update interval per file by an average update interval for the virus pattern. For example, assume that a file is updated once a day on the average by gathering statistics on accesses of a file during a specified period. If the virus pattern is updated once in five days, the last updater logs for the past five accesses. Another method is to record all updaters until the virus database is updated after the scan.

The configuration in FIG. 2 differs from a conventional configuration in that last scan time 204 and last updater 205 are added. These values can be used to determine the necessity of scanning and to specify the user who caused the virus infection. It is preferable to encrypt and save last scan time 204 and last updater 205 in order to prevent an unauthorized user from illegally rewriting each column.

Last scan time 204 and last updater 205 are independent of each other. The file attribute may contain only one or both. Details about the access right are described on pages 58 to 60 of *The Design and Implementation of the* 4.3 *BSD UNIX® Operating System* (Samuel J. Leffler, et al., Addison-Wesley, 1989). Details about the method of managing data blocks are described on pages 191 to 195 of that document.

Figure 3:
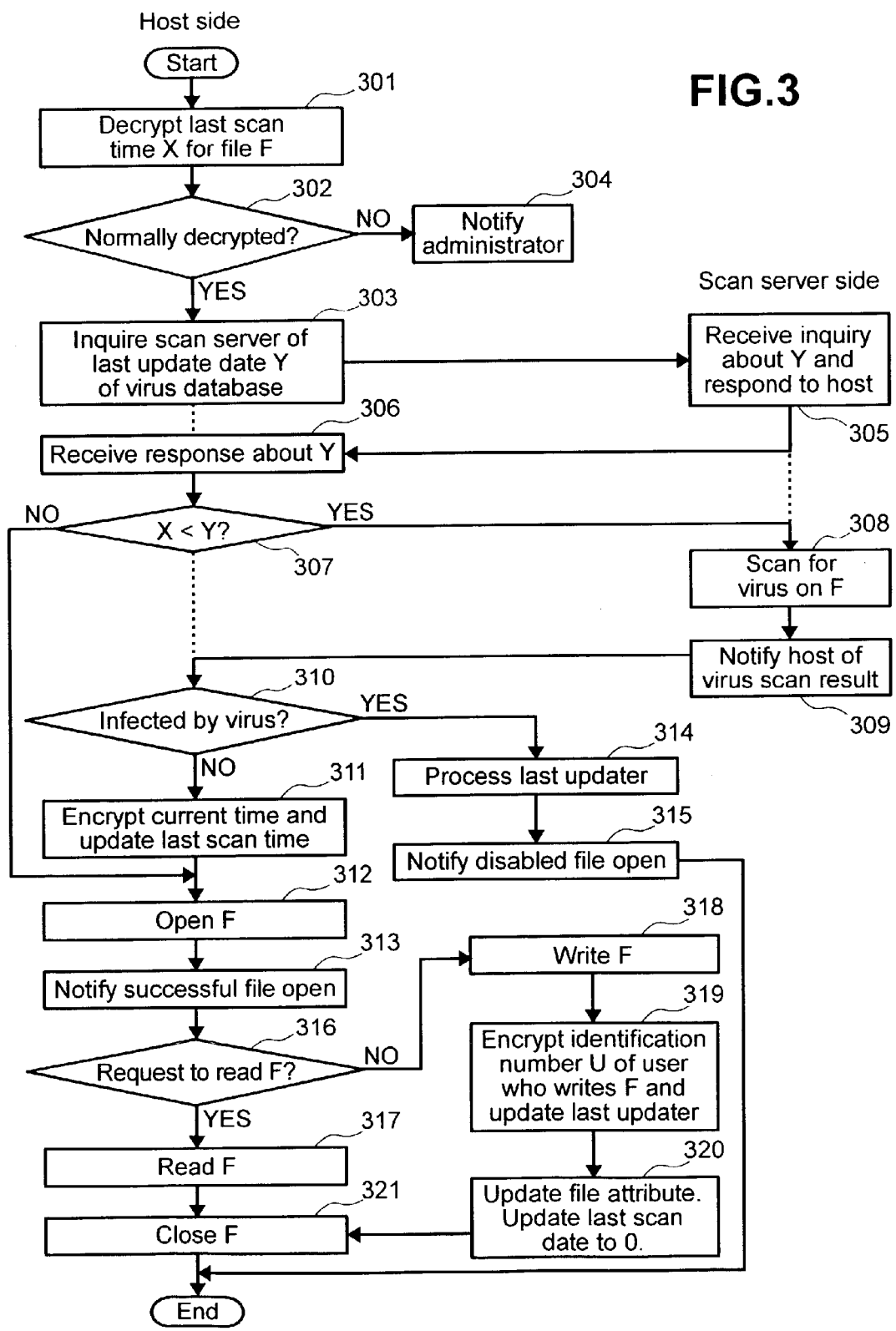
FIG. 3 is a flowchart showing scanning.

FIG. 3 is a flowchart showing file opening according to the present invention. The encryption and decryption below use the DES algorithm, one of the encryption algorithms. First, CPU 132 executes encryption control module 1333 to decrypt the last scan time (hereinafter referred to as X) for F (step 301). Then, CPU 132 determines whether or not the encryption succeeds (step 302). If the result is successful, CPU 132 queries scan server 15 about the last update time (hereafter referred to as Y) for the virus database 1621 (step 303). If the result is unsuccessful, CPU 132 notifies an administrator previously registered to memory 133 of this result, by means, for example, of e-mail (step 304).

Scan server 15 receives the inquiry about Y. CPU 152 reads Y from storage device 162 and responds to host 13 (step 305). Host 13 receives the response (step 306). CPU 132 compares X with Y (step 307). If X is earlier than Y (X<Y), F has been scanned before virus database 1621 has been updated. As a result, F may be infected with the newest virus. CPU 152 scans F (step 308). The scanning details are described in FIG. 4. CPU 152 notifies host 13 of the scan result (step 309). If X is later than Y, no scan is needed. CPU 132 opens F (step 312).

When receiving the result at step 308 from scan server 15, CPU 132 checks F for virus infection based on the result (step 310). If F is not infected, CPU 132 executes encryption control module 1333 to encrypt the current time using the apparatus' serial number K as a key and to update the last scan time 204 (step 311). Thereafter, CPU 132 opens F (step 312) and notifies client 11 of a successful open operation (step 313).

Figure 5:
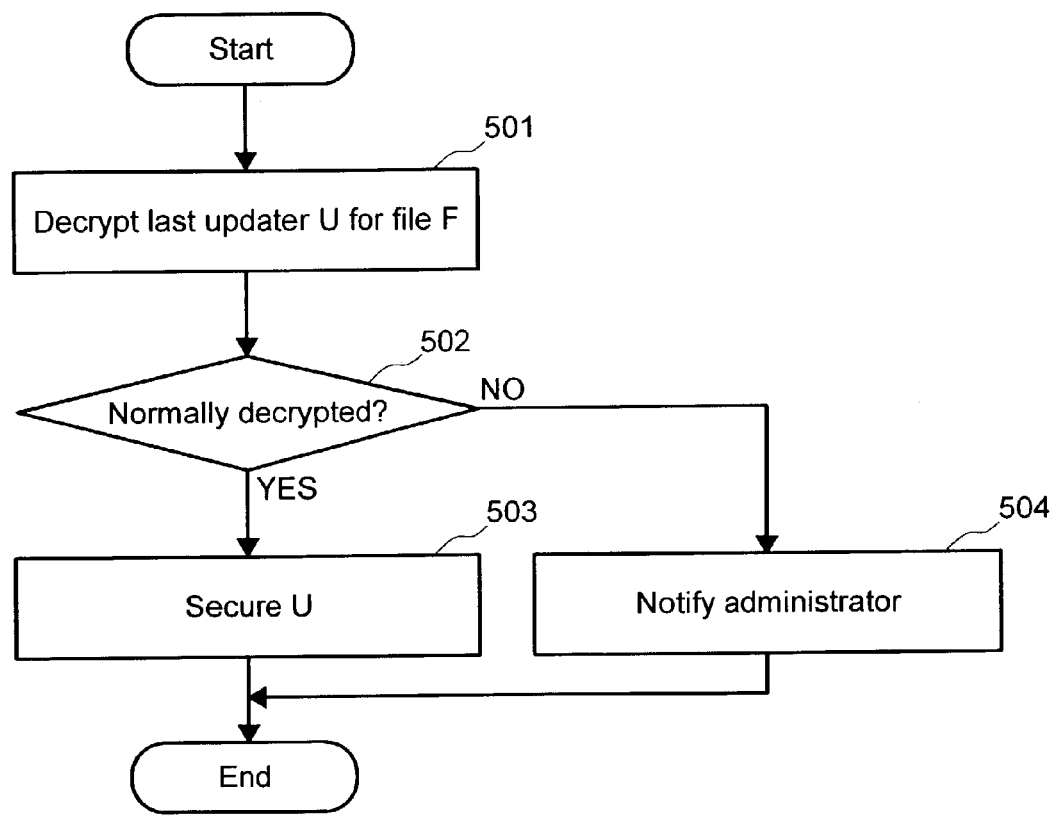
FIG. 5 is a flowchart showing confirming a last update.

If it is determined that F is virus-infected at step 310, CPU 132 must locate the user who caused the virus infection. For this purpose, CPU 132 processes the last updater 205 (step 314). This process is described in (FIG. 5). Thereafter, CPU 132 notifies client 11 of an unsuccessful open operation (step 315) and then terminates the process. After step 313, CPU 132 determines whether or not the access request for F is a read request. If the access request is for reading F, CPU 132 reads F (step 317), closes F (step 321), and terminates the process.

If the access request is for writing F, CPU 132 encrypts the identification number U, which is assigned to a user who wants to write to F, using the apparatus' serial number as a key and updates last updater 205 (step 319). Thereafter, CPU 132 updates the file attribute (step 320). In this example, CPU 132 resets last scan time 204 to 0, whereby last scan time 204 is updated at step 311. With a last scan time of 0, a next file access always causes the result at step 307 to be X<Y, advancing the process to step 308. This is because a file is probably virus-infected when it is updated, necessitating a scan at the next access.

When last scan time 204 is not used, steps 301 to 307 and 311 are omitted. In this case, host 13 sends a scan request. Scan server 15 receives the request and advances the process at step 308. When last updater 205 is not used, step 314 is omitted. In this embodiment, the virus scan is performed at file opening, but the scan may be performed at both file opening and closing. It may be preferable to scan a file by default only at opening and also at closing in accordance with a user's instruction.

Figure 4:
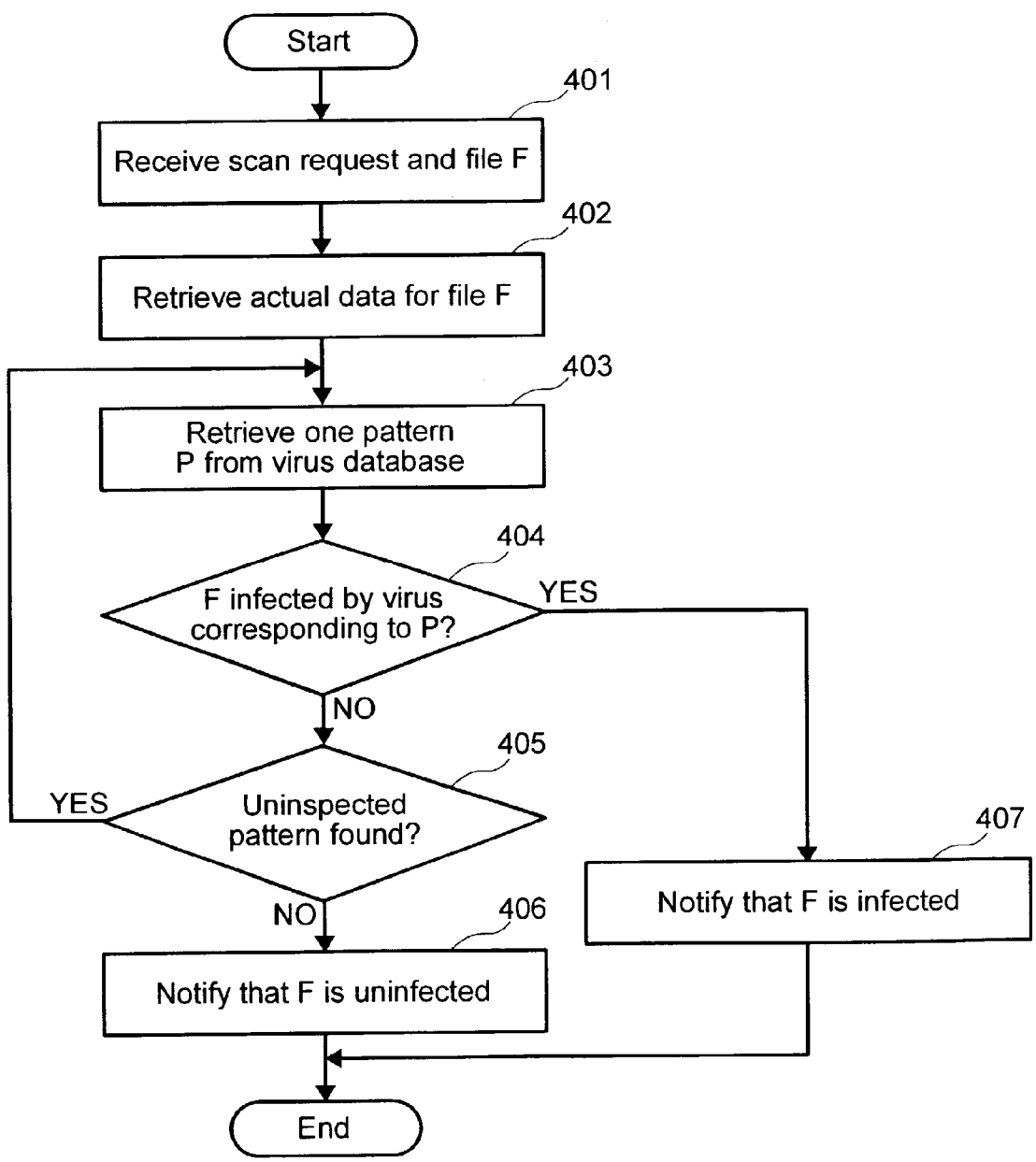
FIG. 4 is a flowchart showing opening a file.

Next referring to FIG. 4, the process at step 308 in FIG. 3 is described. CPU 152 first receives a scan request and F to be scanned from host 13 (step 401) and reads actual data in F (step 402). Thereafter, CPU 152 reads one virus pattern from virus database 1621 (step 403). The read pattern is referred to as P hereinafter. CPU 152 checks whether or not F is infected with a virus corresponding to P (step 404).

If F is not infected, CPU 152 determines whether or not virus database 1621 still contains uninspected patterns (step 405). If an uninspected pattern is found, the process returns to step 403. If no uninspected pattern is found, CPU 152 determines that F is not virus-infected, and notifies host 13 of this result (step 406). If F is infected, CPU 152 notifies host 13 of this result (step 407).

It is possible to provide scan server 15 with an interface to pass last scan time 204 to scan server 15 at step 308. This enables a comparison between X and Y before step 404 (determining the necessity of scanning for each pattern) to decrease the number of processes.

FIG. 5 is a flowchart of encryption control module 1333 executed by CPU 132 at step 314. CPU 132 decrypts last updater 205 for F and assumes it to be U (step 501). The following describes an example of the decryption process. Assuming an input for decryption to be E, CPU 132 assigns an encrypted value. Assuming a key for decryption to be K, CPU 132 assigns the serial number of the same apparatus that is used for the encryption. The serial number is used as a key because this data is not known by the client. CPU 132 decrypts E using K as a key (assuming this result to be D). Finally, CPU 132 returns D to the requester for the decryption.

Figure 6:
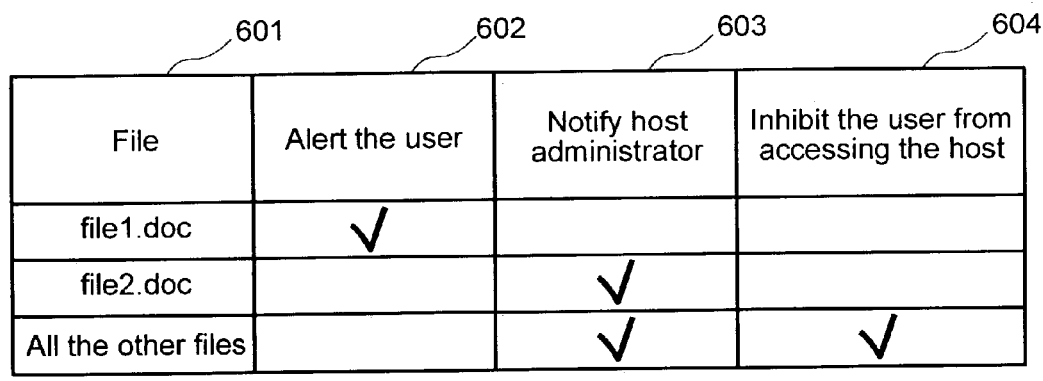
FIG. 6 shows an example of a virus infector countermeasure table.
Figure 7:
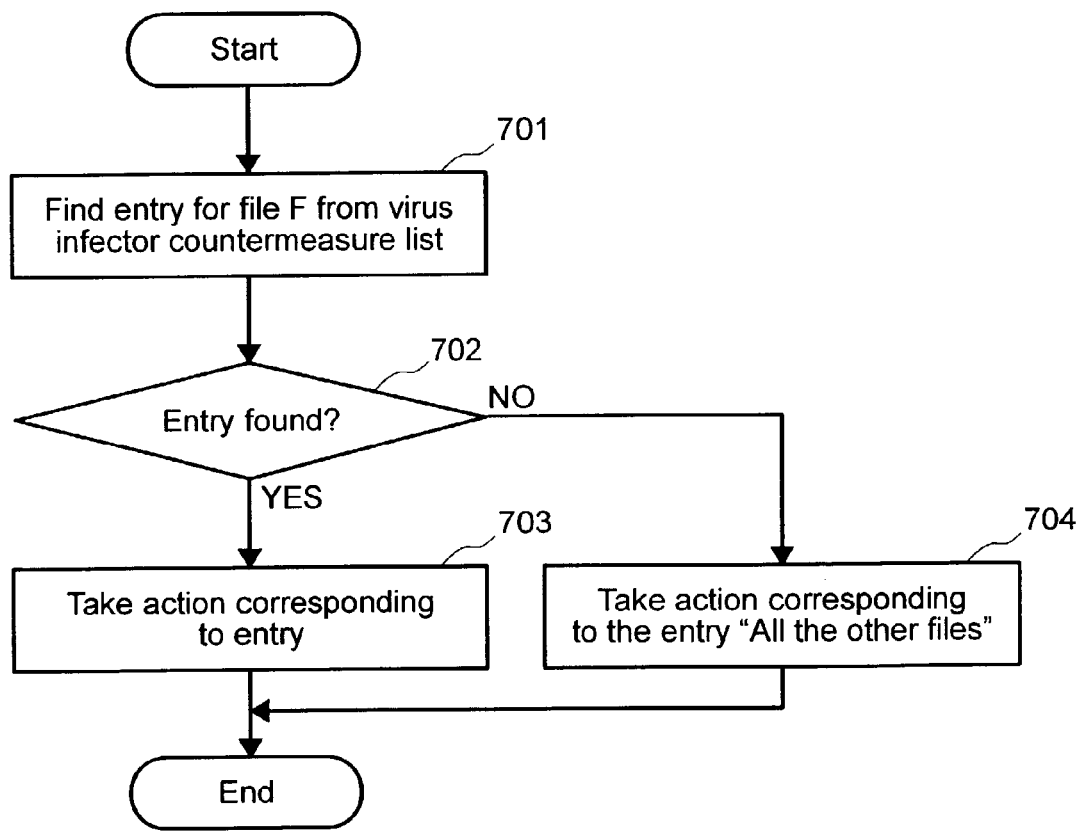
FIG. 7 is a flowchart showing an example of countermeasures against a virus infector.

After step 501, CPU 132 determines whether or not the decryption was successful (step 502). If successful, CPU 132 takes security countermeasures against U (step 503). An example of security countermeasures will be described with (FIGS. 6 and 7). If the decryption is unsuccessful, CPU 132 notifies the administrator previously registered to memory 133 of this result by means, for example, of e-mail (step 504).

The DES algorithm is detailed on pages 56 to 227 of *Internet Security Techniques* (Larry J. Hughes, Jr., New Riders, 1995). Other encryption algorithms than DES can be used if it is a reversible encryption algorithm that can decrypt encrypted data. Any encryption key other than the serial number can be used if it can be always ensured to be the same value for encryption and decryption.

FIG. 6 shows an example of a virus infector countermeasure table stored in memory 133. When the file's last updater is obtained at step 501, CPU 132 uses the table in FIG. 6 to determine a process for the user. The table includes a file name 601 and processes for the file. In FIG. 6, the processes include a process 602 to send an alert to the user, a process 603 to send notification to the administrator of host 13, and a process 604 to prohibit the user from accessing host 13. The host 13 administrator, or the like, determines any or a combination of the processes 602 through 604 for file 601 and describes the processes in the table.

When process 604 is defined, it is possible to prevent the user from accessing host 13. For example, memory 133 stores a list of users who are prohibited from accessing host 13. Registering a user to the list makes it possible to reject subsequent accesses from the user. The table describes the processes not only for specific files, but also for all the other files that need not be specified especially. Due to this description, the table in FIG. 6 need not contain all the files managed by CPU 132, preventing an increase in the amount of information to be described.

FIG. 7 is a flowchart showing a process of CPU 132 for taking countermeasures against a virus infector. CPU 132 finds an entry for F in the table in FIG. 6 (step 701). CPU 132 determines whether or not the table contains an entry for F (step 702). If the entry is found, CPU 132 executes a process corresponding to the entry (step 703). If the entry is not found, CPU 132 finds an entry for "All the other files" and executes the process corresponding to the entry (step 704). The present invention can eliminate unnecessary scans and accelerate file accesses. The present invention also can prevent information from being rewritten illegally and provide a more secure information processing system.

What is claimed is:

1. An information processing system comprising:
   a storage system to store data;
   a host computer to read and write a file configuring data to the storage system; and
   a server computer to execute a process for detecting a virus for the file, the server computer including a database for managing virus patterns, the database having a last update time of a virus pattern indicating a time when the pattern of a virus was last updated;
   wherein the storage system receives, from the server computer, the data of the file to store the data;
   wherein the host computer is provided with file attribute information indicating an attribute of the file, the file attribute information including a last scan time indicating a time when the file was last processed for virus detection and location information indicating where the data of the file is located in the storage system; and
   wherein the host computer determines whether a file is scanned or not on the basis of the last scan time in the file attribute information and the last update time of the virus pattern from the database of the server computer; and if the last scan time is earlier than the last update time, the host computer asks the server computer to scan for virus in the file; and if the last scan time is not earlier than the last update time, the host computer opens the file without virus scanning.

2. The information processing system of claim 1 wherein if the file scanned is not infected with a virus, the file server system updates the last scan time in the file configuration information.

3. The information processing system of claim 1 wherein the file scanned is not infected with a virus; wherein if the open request contains a read request, the file server system reads the file; and wherein if the open request contains a write request, the file server system writes to the file and updates a last updater based on an identification number of a user submitting the write request, the last updater being included in the file configuration information of the file to indicate a user who last updated contents of the file.

4. The information processing system of claim 1 wherein when the file is updated, the computer updates the last scan time to a specified value which is earlier than the last update time.

5. The information processing system of claim 1 wherein if the file scanned is infected with a virus, the file server system locates a source of the virus infection and notifies the computer of an unsuccessful open operation of the file.

6. The information processing system of claim 2 wherein the host computer uses the last updater to take security countermeasures against a user corresponding to the last updater.

7. The information processing system of claim 6 wherein the host computer encrypts the file attribute information.

8. The information processing system of claim 7 wherein the host computer uses an apparatus' serial number as an encryption key.

9. An information processing system comprising:
   a scan server; and
   a storage system coupled to the scan server to store data, the storage system storing a last update time of a virus pattern indicating a time when the pattern of a virus was last updated; and
   a file server system including files to be accessed by a computer and file configuration information of the files, the file configuration information including a last scan time indicating a time when the file was last processed for virus detection and location information indicating where the data of the file is located in the storage system;

wherein the storage system receives, from the scan server, the data of the file to store the data;

wherein the file server system determines whether a file is scanned or not on the basis of the last scan time in the file configuration information and the last update time of the virus pattern from the storage system; and if the last scan time is earlier than the last update time, the file server system asks the scan server to scan for virus in the file; and if the last scan time is not earlier than the last update time, the file server system opens the file without virus scanning.

10. The information processing system of claim 9 wherein if the file scanned is not infected with a virus, the file server system updates the last scan time in the file configuration information.

11. The information processing system of claim 9 wherein the file scanned is not infected with a virus; wherein if the open request contains a read request, the file server system reads the file; and wherein if the open request contains a write request, the file server system writes to the file and updates a last updater based on an identification number of a user submitting the write request, the last updater being included in the file configuration information of the file to indicate a user who last updated contents of the file.

12. The information processing system of claim 11 wherein the file server system uses the last updater to take security countermeasures against a user corresponding to the last updater.

13. The information processing system of claim 12 wherein the file server system encrypts the file configuration information.

14. The information processing system of claim 9 wherein when the file is updated, the file server system updates the last scan time to a specified value which is earlier than the last update time.

15. The information processing system of claim 9 wherein if the file scanned is infected with a virus, the file server system locates a source of the virus infection and notifies the computer of an unsuccessful open operation of the file.

16. A method for processing information, comprising:
providing files to be accessed and file configuration information of the files, the file configuration information including a last scan time indicating a time when the file was last processed for virus detection and location information indicating where the data of the file is located in a storage system that receives the data of the file to store the data;

providing a scan server which includes a last update time of a virus pattern indicating a time when the pattern of a virus was last updated;

receiving an open request for a file;

determining whether a file is scanned or not on the basis of the last scan time in the file configuration information and the last scan time of the virus pattern; and if the last scan time is earlier than the last update time, causing the scan server to scan for virus in the file; and if the last scan time is not earlier than the last update time, opening the file without virus scanning.

17. The method of claim 16 wherein if the file scanned is not infected with a virus, updating the last scan time in the file configuration information.

18. The method of claim 16 wherein the file scanned is not infected with a virus; and further comprising:
if the open request contains a read request, reading the file; and if the open request contains a write request, writing to the file and updating a last updater based on an identification number of a user submitting the write request, the last updater being included in the file configuration information of the file to indicate a user who last updated contents of the file.

19. The method of claim 18 further comprising using the last updater to take security countermeasures against a user corresponding to the last updater.

20. The method of claim 19 further comprising encrypting the file configuration information.

21. The information processing system of claim 1, further comprising:
a client computer to request an open request for a file;

wherein the host computer executes the determination whether a file is scanned or not when the host computer receives the open request for a file.

22. The information processing system of claim 21, wherein the host computer compares the last scan time and the last update time.

23. The information processing system of claim 22, wherein when the file is updated, the host computer changes value of the last scan time to a specified value is earlier than the last update time; and wherein the host computer asks the server computer to scan for virus in the file when the host computer refers to the file attribute information including the last scan time indicating the specified value.

24. The information processing system of claim 23, wherein the host computer encrypts the file attribute information.

* * * * *